United States Patent
Bennett et al.

(10) Patent No.: US 11,597,868 B2
(45) Date of Patent: Mar. 7, 2023

(54) COMPOSITION FOR REMEDIATING IRON SULFIDE IN OILFIELD PRODUCTION SYSTEMS

(71) Applicant: ChampionX USA Inc., Sugar Land, TX (US)

(72) Inventors: Brian Michael Bennett, Sugar Land, TX (US); Kim R. Solomon, River Falls, WI (US); Carter Silvernail, Burnsville, MN (US); Ana Ferrer Carrera, Missouri City, TX (US)

(73) Assignee: ChampionX USA Inc., Sugar Land, TX (US)

( * ) Notice: Subject to any disclaimer, the term of this patent is extended or adjusted under 35 U.S.C. 154(b) by 426 days.

(21) Appl. No.: 15/827,466

(22) Filed: Nov. 30, 2017

(65) Prior Publication Data
US 2018/0148632 A1 May 31, 2018

Related U.S. Application Data

(60) Provisional application No. 62/428,123, filed on Nov. 30, 2016.

(51) Int. Cl.
| | | |
|---|---|---|
| *C09K 8/54* | (2006.01) | |
| *C23G 1/06* | (2006.01) | |
| *C23G 1/08* | (2006.01) | |
| *C23F 11/14* | (2006.01) | |
| *C23F 11/10* | (2006.01) | |
| *C23F 11/16* | (2006.01) | |
| *C09K 8/532* | (2006.01) | |
| *C23F 11/12* | (2006.01) | |
| *C09K 8/524* | (2006.01) | |
| *C23F 11/04* | (2006.01) | |
| *C11D 1/00* | (2006.01) | |

(52) U.S. Cl.
CPC .............. *C09K 8/54* (2013.01); *C09K 8/524* (2013.01); *C09K 8/532* (2013.01); *C11D 1/00* (2013.01); *C23F 11/04* (2013.01); *C23F 11/10* (2013.01); *C23F 11/126* (2013.01); *C23F 11/149* (2013.01); *C23F 11/161* (2013.01); *C23G 1/061* (2013.01); *C23G 1/065* (2013.01); *C23G 1/088* (2013.01); *C09K 2208/32* (2013.01)

(58) Field of Classification Search
CPC ...... C09K 8/532; C09K 8/54; C09K 2208/32; Y10S 507/939
See application file for complete search history.

(56) References Cited

U.S. PATENT DOCUMENTS

| | | | |
|---|---|---|---|
| 4,276,185 A | 6/1981 | Martin | |
| 4,633,949 A | 1/1987 | Crowe | |

(Continued)

FOREIGN PATENT DOCUMENTS

| | | |
|---|---|---|
| CN | 105036365 A | 11/2015 |
| WO | 2016/105381 A1 | 6/2016 |

OTHER PUBLICATIONS

International Search Report and Written Opinion issued for PCT/US2017/063860, dated Feb. 6, 2018, 17 pages.

(Continued)

*Primary Examiner* — Aiqun Li
(74) *Attorney, Agent, or Firm* — Stinson LLP (57) ABSTRACT

A composition for inhibiting corrosion and/or removing hydrocarbonaceous deposits in oil and gas applications is provided. The composition comprises an iron sulfide dissolver, an organic solvent, and a corrosion inhibitor.

21 Claims, 3 Drawing Sheets

(56) References Cited

U.S. PATENT DOCUMENTS 7,951,754 B2 5/2011 Tiwari et al.
2009/0149356 A1 6/2009 Tiwari et al.

OTHER PUBLICATIONS

"Natriumgluconat Produkt Beschreibung," Case No. 527-07-1, ChemicalBook, Dec. 31, 2017, 2 pages, accessed on Jan. 23, 2018 from <http://www.chemicalbook.com/ChemicalProductProperty_DE_CB9229989.htm>.

Gilbert, P. D., et al., "Tetrakishydroxymethylphosphonium Sulfate (THPS) For Dissolving Iron Sulfides Downhole and Topside—A Study of the Chemistry Influencing Dissolution," Paper No. 02030, Corrosion, 2002, pp. 1-14.

Yap, J., et al., "Removing Iron Sulfide Scale: A Novel Approach," Society of Petroleum Engineers International, SPE 138520, pp. 1-10, Presented at the Abu Dhabi International Petroleum Exhibition & Conference held in Abu Dhabi, UAE, Nov. 1-4, 2010.

COMPOSITION FOR REMEDIATING IRON SULFIDE IN OILFIELD PRODUCTION SYSTEMS

CROSS REFERENCE TO RELATED APPLICATIONS

This application claims the benefit of U.S. Provisional Patent Application Ser. No. 62/428,123 filed on Nov. 30, 2016, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

STATEMENT REGARDING PRIOR DISCLOSURES BY THE INVENTOR OR JOINT INVENTORS

Not applicable.

FIELD OF THE INVENTION

Cleaner/corrosion inhibitor compositions are provided, and more particularly compositions for removing oilfield hydrocarbon and iron sulfide based deposits from equipment and for providing protection to the equipment against corrosive fluids and gases.

BACKGROUND OF THE INVENTION

As oilfields age, the amount of oil produced decreases and the amount of water produced with the oil, increases. This water is usually disposed of or injected back into the formation to maintain reservoir pressure. The separation process is efficient, but not perfect, and a small fraction of oil and other debris can be present after the fluids pass through the separation equipment. That residual fraction of oil in water carryover can cause significant problems as the field ages. Fields can produce as much as 1,000,000 barrels of water each day. The residual oil and other particles such as paraffin, asphaltenes, iron sulfide and biomass can build up in the separation equipment and pipelines. This form of deposit is referred to in the industry as schmoo. If left untreated, this form of deposition can plug lines, which can lead to loss of revenue and/or equipment failure, and further, can result in casualties. Due to lines which cannot be mechanically cleaned, a chemical solution is needed that can be injected into the system to maintain control of the deposition in the lines.

Fluids produced in the oil and gas industry can be quite corrosive to the infrastructure by which it is produced. This internal corrosion of pipelines and production equipment is commonly treated using chemical corrosion inhibitors. Corrosion inhibitors work primarily by forming protective films on the surfaces of the infrastructure. This creates a protective barrier from the corrosive fluids. If the schmoo deposition described above is present on the internal surfaces, it does not allow the dosed corrosion inhibitor to effectively coat and protect the equipment.

Schmoo is a complex mixture of inorganic compounds, such as sand and iron sulfide, and organic compounds, such as asphaltenes and crude petroleum. The control and prevention of schmoo is difficult. Schmoo deposits are sticky and difficult to clean, particularly near welds. Currently, commercially available cleaners for removing schmoo from equipment used in oil and gas applications aid in the removal of the organic deposition but are less effective against the inorganic deposition, especially iron sulfide. Conventional cleaners may disperse iron sulfide, but are relatively ineffective in inhibiting or dissolving iron sulfide, providing only limited cleaning ability. Conventional cleaners may also be acidic and therefore incompatible with the metallurgy of the systems they are designed to treat.

What is needed is a means to chemically remove and keep schmoo from depositing on the internal surfaces of production equipment while inhibiting corrosion to help maintain the integrity of the equipment.

BRIEF SUMMARY OF THE INVENTION

A composition for inhibiting corrosion and/or removing hydrocarbonaceous deposits in oil and gas applications is provided. The composition comprises an iron sulfide dissolver, an organic solvent, and a corrosion inhibitor. The iron sulfide dissolver comprises allaric acid, altaric acid, altraric acid, altronic acid, arabinaric acid, arabinonic acid, dihomocitric acid, fructuronic acid, fuconic acid, galactaric acid, galactonic acid, galacturonic acid, glucaric acid, glucoheptonic acid, gluconic acid, glucuronic acid, gulonic acid, homocitric acid, homoisocitric acid, idaric acid, idonic acid, iduronic acid, isocitric acid, mannaric acid, mannonic acid, octulosonic acid, rhamnonic acid, ribonic acid, tagaturonic acid, xylonic acid, or xyluronic acid, or a salt or derivative thereof, or a combination thereof. Preferably, the iron sulfide dissolver comprises gluconic acid or a salt thereof, glucaric acid or a salt or derivative thereof, or a combination thereof. More preferably, the iron sulfide dissolver comprises sodium gluconate, ammonium gluconate, potassium gluconate, lithium gluconate, magnesium gluconate, calcium gluconate, cesium gluconate, gluconic acid, sodium glucarate, ammonium glucarate, potassium glucarate, lithium glucarate, magnesium glucarate, calcium glucarate, cesium glucarate, glucaric acid, or a combination thereof.

Derivatives of the acids described above can be, for example, aldehydo, dehydro, deoxy, erthyro, keto, lower alkyl (e.g., methyl, ethyl, propyl), oxo, or threo forms of the acid or its salt.

Preferably, the organic solvent comprises an alcohol, a hydrocarbon, a ketone, an ether, an alkylene glycol, a glycol ether, an amide, a nitrile, a sulfoxide, an ester, a polyol, or a combination thereof. For example, the organic solvent can comprise methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, glycerin, or a combination thereof.

The composition can comprise water as an additional solvent.

The corrosion inhibitor can comprise an imidazoline compound, a quaternary ammonium compound, a pyridinium compound, or a combination thereof. Preferably, the corrosion inhibitor comprises one or more of the following imidazoline compounds:

(A) an imidazoline of Formula (I):

$$\text{(I)}$$

wherein
$R^{10}$ is a $C_1$-$C_{20}$ alkyl or a $C_1$-$C_{20}$ alkoxyalkyl group;
$R^{12}$ and $R^{13}$ are independently hydrogen or a $C_1$-$C_6$ alkyl group,
$R^{11}$ and $R^{14}$ are independently hydrogen, $C_1$-$C_6$ alkyl, $C_1$-$C_6$ hydroxyalkyl, or $C_1$-$C_6$ arylalkyl; and
$X^-$ is a halide, carbonate, sulfonate, phosphate, or an anion of an organic carboxylic acid;
or a tautomer thereof;

(B) an imidazolinium salt of Formula (II):

$$\text{(II)}$$

wherein
$R^{10}$ is a $C_1$-$C_{20}$ alkyl or a $C_1$-$C_{20}$ alkoxyalkyl group;
$R^{12}$ and $R^{13}$ are independently hydrogen or a $C_1$-$C_6$ alkyl group,
$R^{11}$ and $R^{14}$ are independently hydrogen, $C_1$-$C_6$ alkyl, $C_1$-$C_6$ hydroxyalkyl, or $C_1$-$C_6$ arylalkyl; and
$X^-$ is a halide, carbonate, sulfonate, phosphate, or an anion of an organic carboxylic acid;
or a tautomer thereof;

(C) a bis-quaternized imidazoline compound of Formula (III):

$$\text{(III)}$$

wherein:
$R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof;

$R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof;

$L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$;

$R_5$ is each independently a branched or unbranched alkyl, aryl, alkylaryl, alkylheteroaryl, cycloalkyl, or heteroaryl group having from 1 to about 10 carbon atoms;

n is 0 or 1, and when n is 0, $L_2$ is absent or H;
x is from 1 to about 10; and
y is from 1 to about 5; or
(D) a combination thereof.

Preferably, the corrosion inhibitor comprises a quaternary ammonium compound of Formula (IV):

$$\text{(IV)}$$

wherein $R_1$, $R_2$, and $R_3$ are independently $C_1$ to $C_{20}$ alkyl, $R_4$ is methyl or benzyl, and $X^-$ is a halide or methosulfate.

Preferably, the corrosion inhibitor does not include a phosphate ester.

A method of inhibiting corrosion at a surface and/or removing hydrocarbonaceous deposits from a surface is provided. The method comprises adding an iron sulfide dissolver to a fluid which contacts a surface of a wellbore or equipment used in production, processing, transportation, storage or separation of the fluid to inhibit corrosion and/or remove hydrocarbonaceous deposits from the surface. The iron sulfide dissolver comprises sodium gluconate, ammonium gluconate, potassium gluconate, lithium gluconate, magnesium gluconate, calcium gluconate, cesium gluconate, gluconic acid, sodium glucarate, ammonium glucarate, potassium glucarate, lithium glucarate, magnesium glucarate, calcium glucarate, cesium glucarate, glucaric acid, or a combination thereof. The fluid comprises natural gas or a liquid hydrocarbon.

A method of inhibiting corrosion at a surface and/or removing hydrocarbonaceous deposits from a surface is provided. The method comprises adding the composition as described above to a fluid which contacts a surface of a wellbore or equipment used in production, processing, transportation, storage or separation of the fluid to inhibit corrosion and/or remove hydrocarbonaceous deposits from the surface. The fluid comprises natural gas or a liquid hydrocarbon.

The equipment comprises a pipeline, a storage vessel, downhole injection tubing, a flow line, or an injection line.

The liquid hydrocarbon comprises crude oil, heavy oil, processed residual oil, bituminous oil, coker oil, gas oil, fluid catalytic cracker feed or slurry, naphtha, diesel fuel, fuel oil, jet fuel, gasoline, or kerosene.

Other objects and features will be in part apparent and in part pointed out hereinafter.

DETAILED DESCRIPTION OF THE INVENTION

Disclosed herein are cleaner/corrosion inhibitor compositions, methods of using said compositions, and processes for their preparation. The compositions are useful in crude oil based and natural gas based products, processes, and refinery streams. The described compositions are particularly effective for inhibiting corrosion of mild steel in hydrocarbon, oil/brine mixtures, and aqueous systems. The compositions are also particularly useful for removing hydrocarbonaceous deposits (e.g., schmoo) from metallic or mineral surfaces in contact with a fluid in oil and gas applications, including removal of iron sulfide to reduce the risk of corrosion failures due to under deposit corrosion. The compositions can be used in sweet systems (i.e., systems having a relatively high carbon dioxide concentration) or in systems having sour conditions (i.e., relatively high hydrogen sulfide concentration). The compositions are useful in a wide range of climates and under a wide range of process conditions, (e.g., 0° C. to 200° C.), where other available cleaner/corrosion inhibitor compositions fail.

The disclosed compositions comprise an iron sulfide dissolver comprising allaric acid, altaric acid, altraric acid, altronic acid, arabinaric acid, arabinonic acid, dihomocitric acid, fructuronic acid, fuconic acid, galactaric acid, galactonic acid, galacturonic acid, glucaric acid, glucoheptonic acid, gluconic acid, glucuronic acid, gulonic acid, homocitric acid, homoisocitric acid, idaric acid, idonic acid, iduronic acid, isocitric acid, mannaric acid, mannonic acid, octulosonic acid, rhamnonic acid, ribonic acid, tagaturonic acid, xylonic acid, or xyluronic acid, or a salt of any of these acids or a derivative of any of these acids or their salts, or a combination thereof, preferably gluconic acid or a salt thereof, glucaric acid or a salt thereof, or a combination thereof, and most preferably gluconic acid, a salt thereof, or a combination thereof. The iron sulfide dissolver can either inhibit the formation of iron sulfide or dissolve iron sulfide.

Suitable salts of the iron sulfide dissolver include alkali metal or alkaline earth metal salts, such as sodium, potassium, lithium, magnesium, calcium or cesium salts.

Without being bound by any particular theory, it is believed that the unexpected, superior cleaning performance of the disclosed compositions results from dissolution of iron sulfide at treated surfaces (e.g., interior of pipeline, dirty production equipment). The iron sulfide dissolver, in addition to cleaning performance, can act as a corrosion inhibitor, and is more compatible with steel piping and equipment such as mild steel that existing iron sulfide dispersants used in oilfield applications.

The compositions can provide both corrosion protection and a cleaning effect for applications relating to the production, transportation, storage, and separation of crude oil and natural gas. In particular, the compositions can improve production in an oil and/or gas application by reducing a corrosion rate of and/or removing hydrocarbonaceous deposits (e.g., schmoo) from metallic or mineral surfaces in contact with a fluid in oil and gas applications. The compositions can enhance oil and gas production by keeping surface facility equipment, pipelines, downhole injection tubing and infrastructure, and pore throats around an injector clean to accept an optimum water volume. The compositions can be used in continuous and/or batch dosages to clean out process equipment that has a tendency to accumulate deposits.

The compositions can provide greater than or equal to 90, 95, 96, 97, 98, 99 or 100% corrosion protection. The compositions can provide at least 98% corrosion protection after 12 hours, at least 98% corrosion protection after 18 hours, and/or at least 98% corrosion protection after 20 hours for a carbon steel working electrode in a bubble test, wherein the bubble test is characterized by a testing temperature of about 80° C.; a carbon dioxide saturated liquid medium of 10% field crude oil and 90% synthetic brine; and an inhibitor dosage of 10 ppm based on total fluids.

The compositions disclosed herein can include a corrosion inhibitor component comprised of one or more corrosion inhibitors. The corrosion inhibitor(s) can be present in an amount of about 5 wt. % to about 95 wt. %, about 10 wt. % to about 50 wt. %, or about 15 wt. % to about 30 wt. %, based on total weight of the composition. The corrosion inhibitor(s) can constitute about 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90 or 95 wt. % of the cleaner/corrosion inhibitor composition, based on total weight of the composition. Preferably, the compositions comprise about 20 to about 30 wt. % of the corrosion inhibitor(s), based on total weight of the composition.

Suitable corrosion inhibitors include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

The corrosion inhibitor component can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III). Suitable imidazolines include those of Formula (I):

(I)

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The corrosion inhibitor component can include an imidazolinium compound of Formula (II):

(II)

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The corrosion inhibitor can comprise a bis-quaternized compound having the formula (III):

(III)

wherein:

$R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof;

$R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof;

$L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$;

$R_5$ is each independently a branched or unbranched alkyl, aryl, alkylaryl, alkylheteroaryl, cycloalkyl, or heteroaryl group having from 1 to about 10 carbon atoms;

n is 0 or 1, and when n is 0, $L_2$ is absent or H;

x is from 1 to about 10; and y is from 1 to about 5.

Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H$_2$; and $L_2$ is absent, H, —COOH, —SO$_3$H, or —PO$_3$H$_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —C$_2$H$_2$—; n is 1 and $L_2$ is —COOH or n is 0 and $L_2$ is absent or H; x is 2; y is 1; $R_3$ and $R_4$ are —C$_2$H$_2$—; and $L_1$ is —COOH.

It should be appreciated that the number of carbon atoms specified for each group of formula (III) refers to the main chain of carbon atoms and does not include carbon atoms that may be contributed by substituents.

The corrosion inhibitor can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —SO$_3$H, or —PO$_3$H$_2$; and $L_2$ is absent or H. Preferably, a bis-quaternized compound has the formula (III) wherein $R_1$ and $R_2$ are each independently $C_{16}$-$C_{18}$ alkyl; $R_4$ is —C$_2$H$_2$—; x is 2; y is 1; n is 0; $L_1$ is —COOH, —SO$_3$H, or —PO$_3$H$_2$ and $L_2$ is absent or H.

The imidazoline and/or imidazolinium compound can comprise 0 to 100 wt. %, about 10 to 60 wt. %, or about 30 to 45 wt. % of the corrosion inhibitor component, based on total weight of the corrosion inhibitor component. Preferably, the imidazoline and/or imidazolinium compound can constitute about 30 to 40 wt. % of the corrosion inhibitor component, based on total weight of the corrosion inhibitor component.

The corrosion inhibitor can be a quaternary ammonium compound of Formula (IV):

(IV)

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms, and X is Cl, Br or I. For the quaternary salts, R$^{5a}$, R$^{6a}$, R$^{7a}$, and R$^{8a}$ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The quaternary ammonium salts can comprise 0 to 100 wt. %, about 20 to 80 wt. %, or about 50 to 65 wt. % of the corrosion inhibitor component, based on total weight of the corrosion inhibitor component. Preferably, the quaternary ammonium salt constitutes about 50-60 wt. % of the corrosion inhibitor component, based on total weight of the corrosion inhibitor component.

The corrosion inhibitor component can comprise a pyridinium salt such as those represented by Formula (V):

(V)

wherein $R^9$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The pyridinium salt can constitute 0 wt. % to 100 wt. %, about 10 to 60 wt. %, or about 30 to 40 wt. % of the corrosion inhibitor component, based on total weight of the corrosion inhibitor component.

The corrosion inhibitor components can include additional corrosion inhibitors such as phosphate esters, monomeric or oligomeric fatty acids, or alkoxylated amines.

The corrosion inhibitor component can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor component can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The corrosion inhibitor component can comprise an alkoxylated amine. The alkoxylated amine can be an ethoxylated alkyl amine. The alkoxylated amine can be ethoxylated tallow amine. The alkoxylated amine can constitute 0 wt. % to 100 wt. %, about 10 to 60 wt. %, or about 20 to 30 wt. % of the corrosion inhibitor component, based on total weight of the corrosion inhibitor component.

Preferably, the corrosion inhibitor comprises the quaternary ammonium salt and the bis-quaternized compound of Formula (III).

The compositions disclosed herein can include a solvent. The solvent can be present in an amount of 5 wt. % to about 95 wt. %, about 20 wt. % to about 80 wt. %, or about 40 wt. % to about 60 wt. %, based on total weight of the composition. The solvent can constitute about 5, 10, 15, 20, 25, 30, 35, 40, 45, 50, 55, 60, 65, 70, 75, 80, 85, 90 or 95 wt. % of the composition.

Suitable solvents include, but are not limited to, alcohols, hydrocarbons, ketones, ethers, alkylene glycols, glycol ethers, amides, nitriles, sulfoxides, esters, and water. The solvent can be water, isopropanol, methanol, ethanol, 2-ethylhexanol, heavy aromatic naphtha, toluene, ethylene glycol, ethylene glycol monobutyl ether (EGMBE), diethylene glycol monoethyl ether, or xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), alkylene glycols (methylene glycol, ethylene glycol, 1,2-propylene glycol, 1,3-propylene glycol, etc.) glycol ethers (diethyleneglycol monomethyl ether, ethylene glycol monobutyl ether, ethylene glycol dibutyl ether, etc.), ketones (cyclohexanone, diisobutylketone), ethers (diethyl ether, etc.), an alkylene carbonate (propylene carbonate, etc.), N-methylpyrrolidinone (NMP), N,N-dimethylformamide, a polyol (glycerin, etc.), and the like. Representative non-polar solvents suitable for formulation with the composition include aliphatic hydrocarbons such as pentane, hexane, cyclohexane, methylcyclohexane, heptane, decane, dodecane, diesel, and the like; aromatic hydrocarbons such as toluene, xylene, heavy aromatic naphtha; and fatty acid derivatives (acids, esters, amides), and the like.

The solvent can be a solvent compatible with an arctic environment, as for example, methanol, ethanol, ethylene glycol or glycerin, which improves the anti-freeze properties of the composition. Such solvent is typically present in an amount of about 5 to about 15 wt. %, and preferably about 10 wt. %, based on total weight of the composition to have an anti-freeze effect.

The compositions disclosed herein can include a sulfur-containing compound. The sulfur-containing compound can be present in an amount of about 1 wt. % to about 20 wt. %, about 1 wt. % to about 10 wt. %, or about 1 to about 5 wt. % based on total weight of the composition. The sulfur-containing compound can constitute about 1, 2, 3, 4, 5, 6, 7, 8, 9, 10, 11, 12, 13, 14, 15, 16, 17, 18, 19 or 20 wt. % of the cleaner/corrosion inhibitor composition, based on total weight of the composition.

Suitable sulfur-containing compounds include compounds that enhance the corrosion inhibiting and/or cleaning performance of the composition such as synergists. The sulfur-containing compound can include, but is not limited to, thioglycolic acid, 3,3'-dithiodipropionic acid, thiourea, 2-mercaptoethanol, L-cysteine, tert-butyl mercaptan, sodium thiosulfate, ammonium thiosulfate, sodium thiocyanate, ammonium thiocyanate, sodium metabisulfite, or a combination thereof. Preferably, the sulfur-containing compound is 2-mercaptoethanol.

The compositions can optionally include one or more additives. Suitable additives include, but are not limited to, asphaltene inhibitors, paraffin inhibitors, scale inhibitors, emulsifiers, water clarifiers, dispersants, emulsion breakers, hydrogen sulfide scavengers, gas hydrate inhibitors, biocides, pH modifiers, and surfactants.

The composition can comprise from about 0.1 to 10 wt. %, from about 0.1 to 5 wt. %, or from about 0.5 to 4 wt. % of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The composition can comprise from about 0.1 to 10 wt. %, from about 0.1 to 5 wt. %, or from about 0.5 to 4 wt. % of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylam ides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The composition can comprise from about 0.1 to 10 wt. %, from about 0.5 to 5 wt. %, or from about 0.5 to 4 wt. % of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

The composition can comprise from about 0.1 to 10 wt. %, from about 0.5 to 5 wt. %, or from about 0.5 to 4 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

The composition can comprise from about 0.5 to 20 wt. %, from about 1 to 15 wt. %, or from about 1 to 10 wt. % of an additional hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; and triazines (e.g., monoethanolamine triazine, monomethylamine triazine, and triazines from multiple amines or mixtures thereof).

The composition can comprise from about 0.1 to 25 wt. %, from about 0.5 to 20 wt. %, or from about 1 to 10 wt. % of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The composition can comprise from about 0.1 to 25 wt. %, from about 0.5 to 20 wt. %, or from about 1 to 10 wt. % of a kinetic hydrate inhibitor or anti-agglomerate, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The composition can comprise from about 0.1 to 10 wt. %, from about 0.5 to 5 wt. %, or from about 0.5 to 4 wt. % of a biocide, based on total weight of the composition. Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The composition can comprise from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoxyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

The surfactant can be a quaternary ammonium compound, an amine oxide, an ionic or nonionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl) dimethyl quaternary ammonium methyl sulfate.

Compositions made according to the invention can further include additional functional agents or additives that provide a beneficial property. The amount of an additional agent or additive, when present, will vary according to the particular composition being manufactured and its intended use as one skilled in the art will appreciate.

Compositions of the invention can be prepared by combining the iron sulfide dissolver with a solvent to form a solution. To the solution can be added one or more additional corrosion inhibitors, sulfur-containing compounds, and/or solvents, and any other additives.

The compositions of the invention can be used for inhibiting corrosion and/or removing hydrocarbonaceous deposits (e.g., schmoo) in oil and gas applications. The compositions of the invention can be used in any industry where it is desirable to inhibit corrosion and/or remove hydrocarbonaceous deposits from a surface.

The method comprises contacting any of the compositions described herein or the iron sulfide dissolver with the metal surface to reduce, inhibit or prevent corrosion and/or remove hydrocarbonaceous deposits from the metal surface.

The compositions can be used for inhibiting corrosion and/or removing hydrocarbonaceous deposits by treating a gas or liquid stream with an effective amount of a composition of the invention, as described herein.

The cleaner/corrosion inhibitor compositions can be used in water systems, condensate/oil systems/gas systems, or any combination thereof. For example, the compositions can be used in controlling scale on heat exchanger surfaces.

The compositions can be applied to a gas or liquid produced, or used in the production, transportation, storage, and/or separation of crude oil or natural gas.

The compositions can be applied to a gas stream used or produced in a coal-fired process, such as a coal-fired power plant.

The compositions can be applied to a gas or liquid produced or used in a waste-water process, a farm, a slaughter house, a land-fill, a municipality waste-water plant, a coking coal process, or a biofuel process.

A fluid to which the compounds and compositions can be introduced can be an aqueous medium. The aqueous medium can comprise water, gas, and optionally liquid hydrocarbon.

A fluid to which the compounds and compositions can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The fluid or gas can be a refined hydrocarbon product.

A fluid or gas treated with a composition of the invention can be at any selected temperature, such as ambient temperature or an elevated temperature. The fluid (e.g., liquid hydrocarbon) or gas can be at a temperature of from about 40° C. to about 250° C. The fluid or gas can be at a temperature of from −50° C. to 300° C., 0° C. to 200° C., 10° C. to 100° C., or 20° C. to 90° C. The fluid or gas can be at a temperature of −20° C., −15° C., −10° C., −5° C., or 0° C. The fluid or gas can be found in an arctic environment, and can have a temperature and salinity typical of such environment.

The compositions of the invention can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1 to 24%, or about 10% to 25% weight/weight (w/w) total dissolved solids (TDS).

The fluid or gas in which the compositions of the invention are introduced can be contained in and/or exposed to many different types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The compositions can be introduced to large diameter flow lines of from about 1 inch to about 4 feet in diameter, small gathering lines, small flow lines and headers. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The surface can be a metal surface, such as carbon steel conduit or pipeline or mild steel conduit or pipeline.

The compositions of the invention can be introduced into a fluid or gas by any appropriate method for ensuring dispersal through the fluid or gas.

The composition can be added to the hydrocarbon fluid before the hydrocarbon fluid contacts the surface.

The composition can be added at a point in a flow line upstream from the point at which corrosion prevention and/or schmoo removal is desired.

The compositions can be injected using mechanical equipment such as chemical injection pumps, piping tees, injection fittings, atomizers, quills, and the like.

The compositions of the invention can be introduced with or without one or more additional polar or non-polar solvents depending upon the application and requirements.

The compositions of the invention can be pumped into an oil and/or gas pipeline using an umbilical line. A capillary injection system can be used to deliver the compositions to a selected fluid.

A fluid to which the compositions can be introduced can be an aqueous medium. The aqueous medium can comprise water, gas, and optionally liquid hydrocarbon. A fluid to which the compositions can be introduced can be a liquid hydrocarbon.

The compositions can be introduced into a liquid and mixed.

The compositions can be injected into a gas stream as an aqueous or non-aqueous solution, mixture, or slurry.

The fluid or gas can be passed through an absorption tower comprising a composition of the invention.

The compositions can be applied to a fluid or gas to provide any selected concentration. In practice, the compositions of the invention are typically added to a flow line to provide an effective treating dose of the described compositions from about 0.01 to about 5,000 ppm. The compositions can be applied to a fluid or gas to provide at a concentration of about 1 parts per million (ppm) to about 1,000,000 ppm, about 1 parts per million (ppm) to about 100,000 ppm, or about 10 ppm to about 75,000 ppm. The compositions can be applied to a fluid at a concentration of about 100 ppm to about 10,000 ppm, about 200 ppm to about 8,000 ppm, or about 500 ppm to about 6,000 ppm. The compositions can be applied to a fluid or gas to provide a concentration of 10 ppm, 20 ppm, 100 ppm, 200 ppm, 500 ppm, or 1,000 ppm. Each system can have its own requirements, and the effective amount of a composition to sufficiently reduce the rate of corrosion and/or remove schmoo can vary with the system in which it is used.

The compositions can be applied continuously, in batch, or a combination thereof. For example, the composition doses can be continuous to prevent corrosion or intermittent (i.e., batch treatment) to remove hydrocarbonaceous deposits. The composition doses can be continuous/maintained and/or intermittent to both inhibit corrosion and remove deposits. Dosage rates for continuous treatments typically range from about 10 to about 500 ppm, or about 10 to about 200 ppm. Dosage rates for batch treatments typically range from about 10 to about 400,000 ppm, or about 10 to about 20,000 ppm. The composition can also be applied as a pill to a pipeline, for example, to provide a high dose (e.g., 20,000 ppm) of the composition.

The flow rate of a flow line in which the composition is used can be between 0 and 100 feet per second, or between 0.1 and 50 feet per second. The compositions can be formulated with water in order to facilitate addition to the flow line.

Definitions

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, arylalkyl or heteroarylalkyl groups, arylalkoxy or heteroarylalkoxy groups, carboxyl groups, heterocyclic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents, as defined above.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), isopropenyl, 2-methyl-1-propenyl, 1-butenyl, and 2-butenyl. Alkenyl groups can be unsubstituted or substituted by one or more suitable substituents, as defined above.

The term "alkynyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups can be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "carbonyl," "(C=O)" or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e., alkoxy(C=O)—NH—) refers to an alkyl carbamate group. The carbonyl group is also equivalently defined herein as (C=O). Alkylcarbonylamino refers to groups such as acetamide.

The term "cycloalkyl", as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexane, bicyclo[2.2.1]heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "-ene" as used as a suffix as part of another group denotes a bivalent radical in which a hydrogen atom is removed from each of two terminal carbons of the group. For example, alkylene denotes a bivalent alkyl group such as methylene (—CH$_2$—) or ethylene (—CH$_2$CH$_2$—). For clarity, addition of the -ene suffix is not intended to alter the definition of the principal word other than denoting a bivalent radical. Thus, continuing the example above, alkylene denotes an optionally substituted linear or branched bivalent hydrocarbon radical.

The term "halo" or "halogen," as used herein, refers to a fluoro, chloro, bromo or iodo radical. Likewise, the term "halide" refers to fluoride, chloride, bromide, iodide or the like.

The term "heteroaryl," as used herein, refers to a monocyclic, bicyclic, or tricyclic aromatic heterocyclic group containing one or more heteroatoms selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups can be unsubstituted or substituted by one or more suitable substituents, preferably 1 to 5 suitable substituents, as defined above.

The term "heterocycle," as used herein, refers to a monocyclic, bicyclic, or tricyclic group containing 1 to 4 heteroatoms selected from N, O, S(O)$_n$, P(O)$_n$, PR$^x$, NH or NR$^x$, wherein R$^x$ is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydrothiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazinyl, morpholinyl, 1,2-tetrahydrodiazin-2-yl, 1,3-tetrahydrodiazin-1-yl, 1,4-oxazin-2-yl, and 1,2,5-oxathiazin-4-yl. Heterocyclic groups can be unsubstituted or substituted by one or more suitable substituents, preferably 1 to 3 suitable substituents, as defined above.

The term "hydroxy," as used herein, refers to an —OH group.

The term "oxo," as used herein, refers to a double bonded oxygen (=O) radical wherein the bond partner is a carbon atom. Such a radical can also be thought as a carbonyl group.

The term "counterion," as used herein, means a halide (e.g., fluoride, chloride, bromide, iodide), a carboxylate anion, such as selected from deprotonation of mineral acid, acrylic acid, acetic acid, methacrylic acid, glycolic acid, thioglycolic acid, propionic acid, butyric acid, and the like, or any other anionic constituent that satisfies the charge balance necessary to form a neutral molecule.

The term "sweetening," as used herein, can refer to a process that removes sulfur species from a gas or liquid. The sulfur species can include hydrogen sulfide and mercaptans.

The term "water cut," as used herein, means the percentage of water in a composition containing an oil and water mixture.

The term "hydrocarbonaceous deposit," as used herein, refers to any deposit including at least one hydrocarbon constituent and forming on the inner surface of flowlines, pipelines, injection lines, wellbore surfaces, storage tanks, process equipment, vessels, the like, and other components in oil and gas applications. Such deposits also include "schmoo," which refers to a solid, paste-like, or sludge-like substance that adheres to almost any surface with which it comes in contact and is particularly difficult to remove. Deposits contributing to schmoo can include, for example, sand, clays, sulfur, naphthenic acid salts, corrosion byproducts, biomass, and other hydrocarbonaceous materials bound together with oil. These terms are used interchangeably herein.

The term "TOFA," as used herein, refers to a tall oil fatty acid that is a distilled product derived from trees and includes a mixture of fatty acids.

Having described the invention in detail, it will be apparent that modifications and variations are possible without departing from the scope of the invention defined in the appended claims.

EXAMPLES

The following non-limiting examples are provided to further illustrate the invention.

Examples 1-15: Cleaner/Corrosion Inhibitor Compositions

Table 1 summarizes exemplary compositions of the invention. The raw materials are commercially available.

The compositions of Table 1 can be prepared by adding sodium gluconate to distilled water to form a solution. A mixture of benzyl dimethyl $C_{12}$-$C_{18}$ alkyl ammonium chloride, a bis-quaternized compound and 2-mercaptoethanol can be combined with the solution, and then another solvent can be added with shaking to form the composition. The compositions can be visually inspected after a three week period to determine whether any precipitation, flocculation or phase separation occurred at room temperature.

The effect of different solvents was tested in Examples 6 to 11. Each of these examples was prepared with the same amount of iron sulfide dissolver, solvent and corrosion inhibitor/sulfur-containing compound, but the solvent species were varied. The variation in solvents did not impact the stability of the formulation, and the observations are reported in Table 1.

The bis-quaternized compound of Table 1 has the formula:

wherein $R_T$ is derived from a mixture of tall oil fatty acids and is predominantly a mixture of $C_{17}H_{33}$ and $C_{17}H_{31}$.

Example 16: Corrosivity Evaluation Via Bubble Test

Sodium gluconate was evaluated for corrosion performance as compared to THPS via a bubble test procedure. The bubble test simulates low flow areas where little or no mixing of water and oil occurs. The test was conducted using 100% synthetic brine. The brine was placed into kettles and purged with carbon dioxide. The brine was continually purged with carbon dioxide to saturate the brine prior to starting the test. After the test began, the test cell was blanketed with carbon dioxide one hour prior to electrode insertion and through the duration of the test to maintain saturation. The kettles were stirred at 150 revolutions per minute (rpm) for the duration of the test to maintain thermal equilibrium at 80° C. The corrosion rate was measured by Linear Polarization Resistance (LPR) techniques. The working electrode used was carbon steel. The counter and reference electrodes were both 1018 carbon steel. The electrodes were all cleaned and polished prior to testing. Data were

TABLE 1

Compositions of Examples 1-15 (NT = Not Tested)

| | | EXAMPLE # | | | | | | | | | | | | | | |
|---|---|---|---|---|---|---|---|---|---|---|---|---|---|---|---|---|
| Component | | 1 | 2 | 3 | 4 | 5 | 6 | 7 | 8 | 9 | 10 | 11 | 12 | 13 | 14 | 15 |
| Iron Sulfide Dissolver (wt. %) | Sodium Gluconate | 5 | 5 | 10 | 10 | 10 | 15 | 15 | 15 | 15 | 15 | 15 | 20 | 25 | 30 | 40 |
| Solvent | Distilled water | 60 | 60 | 55 | 55 | 50 | 50 | 50 | 50 | 50 | 50 | 50 | 35 | 25 | 20 | 10 |
| Corrosion Inhibitor/ Sulfur Containing Compound (wt. %) | Benzyl dimethyl $C_{12}$-$C_{18}$ alkyl quaternary ammonium chloride; Bis-quaternized compound; 2-mercapto-ethanol | 5 | 10 | 15 | 20 | 25 | 25 | 25 | 25 | 25 | 25 | 25 | 30 | 35 | 40 | 45 |
| Solvent (wt. %) | Methanol | | | 20 | | 15 | 10 | 0 | 5 | 0 | 0 | 0 | 15 | | | |
| | Ethanol | 15 | | | | 0 | 0 | 0 | 0 | 0 | 10 | 0 | | | | 5 |
| | Isopropanol | | 25 | | | 0 | 0 | 0 | 0 | 10 | 0 | 0 | | | | |
| | Ethylene Glycol | | | | 15 | 0 | 0 | 10 | 5 | 0 | 0 | 0 | 15 | | | |
| | Propylene Carbonate | 15 | | | | 0 | 0 | 0 | 0 | 0 | 0 | 10 | | | 10 | |
| | Total | 100 | 100 | 100 | 100 | 100 | 100 | 100 | 100 | 100 | 100 | 100 | 100 | 100 | 100 | 100 |
| Stability Testing | Room temperature | NT | NT | NT | NT | Stable (no precipitation, phase separation, flocculation) | | | | | | | NT | NT | NT | NT | collected for four hours before each of the compositions was dosed into its respective cell. Data were collected overnight. The synthetic brine was composed of 5.64 g $CaCl_2 \cdot 2H_2O$, 7.2 g $MgCl_2 \cdot 6H_2O$, 1.32 g KCl, 0.96 g $Na_2SO_4$, 16.8 g $NaHCO_3$, 205.8 g. NaCl, 1.08 g NaBr, and 10.8 g acetic acid in 12 liters of water. The brine had a pH of 5.5

Figure 1:
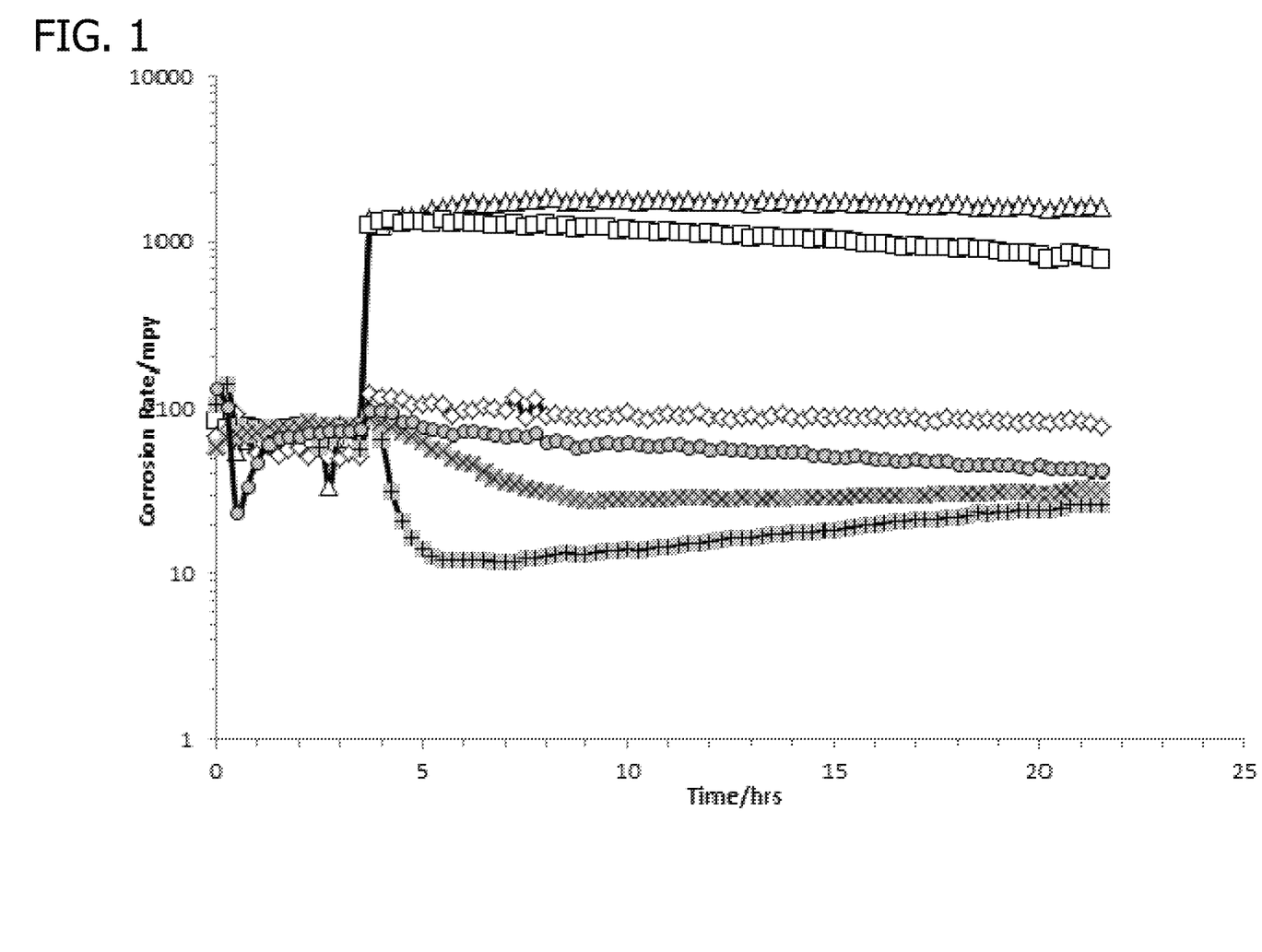
FIG. 1 is a graph of the corrosion rate versus time in a bubble test and shows corrosivity of sodium gluconate (-+- 37,000 ppm; -X- 10,000 ppm, and -○- 1,000 ppm)) as compared to THPS (-▲- 37,000 ppm; -■- 10,000 ppm, and -♦- 1,000 ppm)) in a brine solution at equivalent dosages.

The results of the bubble test are shown in FIG. 1, wherein ppm is parts per million, and mpy is mils per year. The corrosivity of sodium gluconate was compared directly to THPS in a brine solution at equivalent dosages.

All kettles that received a dosage of THPS demonstrated an increase in the untreated corrosion rate. All kettles that received a dosage of sodium gluconate showed no change in corrosion rate or a reduction in the untreated corrosion rate.

Example 17: Corrosion Performance Evaluation Via Bubble Test

Figure 2:
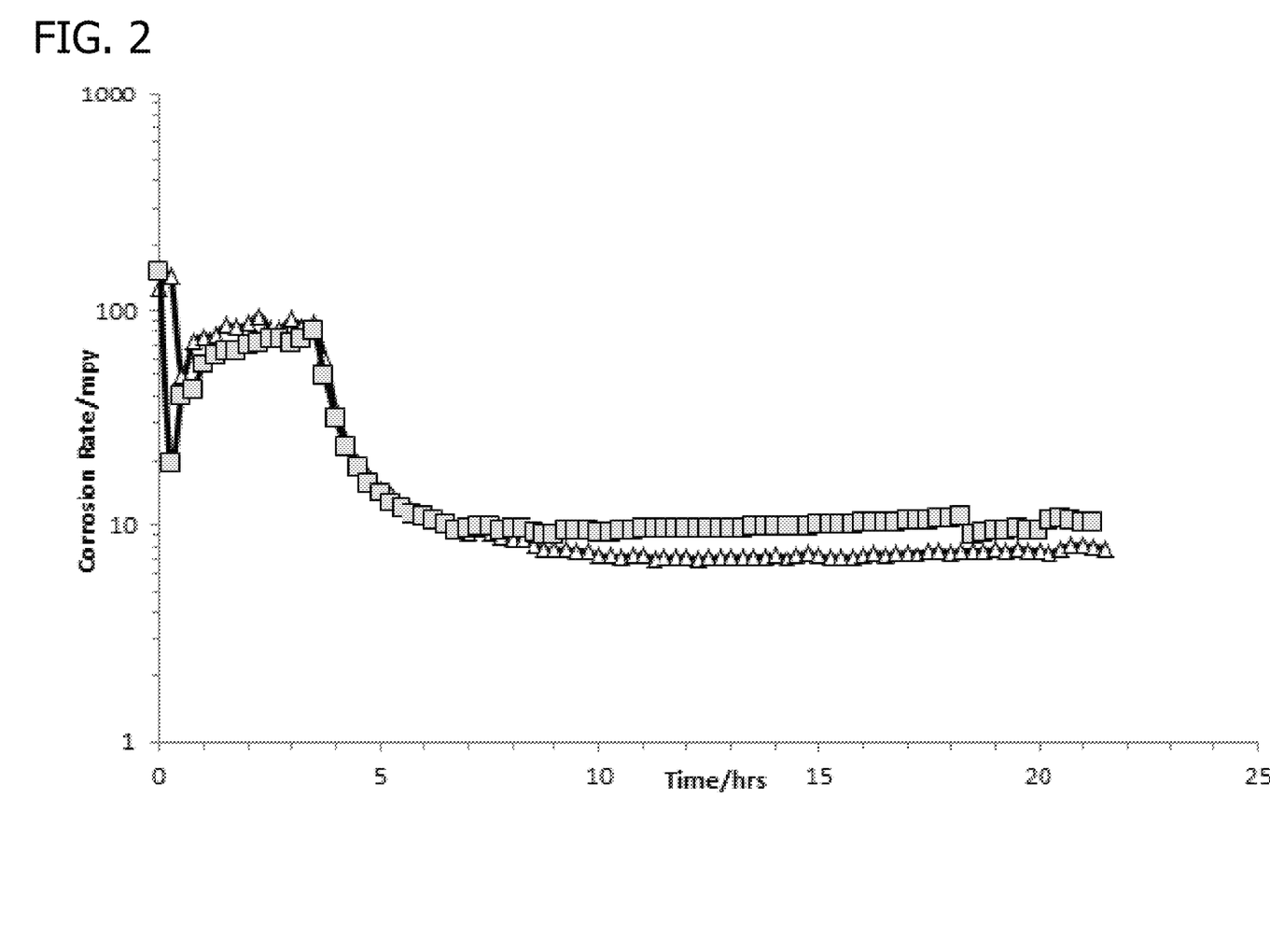
FIG. 2 is a graph of the corrosion rate versus time in a bubble test to show the effect of a sodium gluconate formulation (-■-) on corrosion performance as compared to an incumbent material containing THPS (-▲-)

The effect of sodium gluconate on corrosion performance as compared to THPS was evaluated via a bubble test procedure as described in Example 16 using the incumbent material containing THPS as one test formulation and the formulation of Example 8 as a second test formulation. Data were collected for four hours before each of the compositions was dosed into its respective cell. Data were collected overnight after the cells were dosed. The results of the bubble test are shown in FIG. 2, wherein ppm is parts per million, and mpy is mils per year.

The kettle that received a dosage of the sodium gluconate-containing formulation showed no significant change in corrosion rate as compared to the kettle that received a dosage of the incumbent corrosion inhibitor formulation in combination with THPS. Neither additive impacted the performance of the corrosion inhibitor in this test.

Example 18: Iron Sulfide Solubilization Performance

Aqueous samples held at 150° F. were prepared using iron chloride and sodium sulfide to afford an aqueous iron sulfide composition having about 30 ppm iron present. The experimental treatments of a commercially available corrosion inhibitor formulation, a sample of the corrosion inhibitor formulation spiked with 25% THPS, and another sample of the corrosion inhibitor formulation spiked with 25% sodium gluconate were then added to the aqueous samples which were subsequently held for another 30 minutes. The samples were then filtered using a 0.2 micron filter and the supernatant analyzed for iron by inductively coupled plasma analysis.

Figure 3:
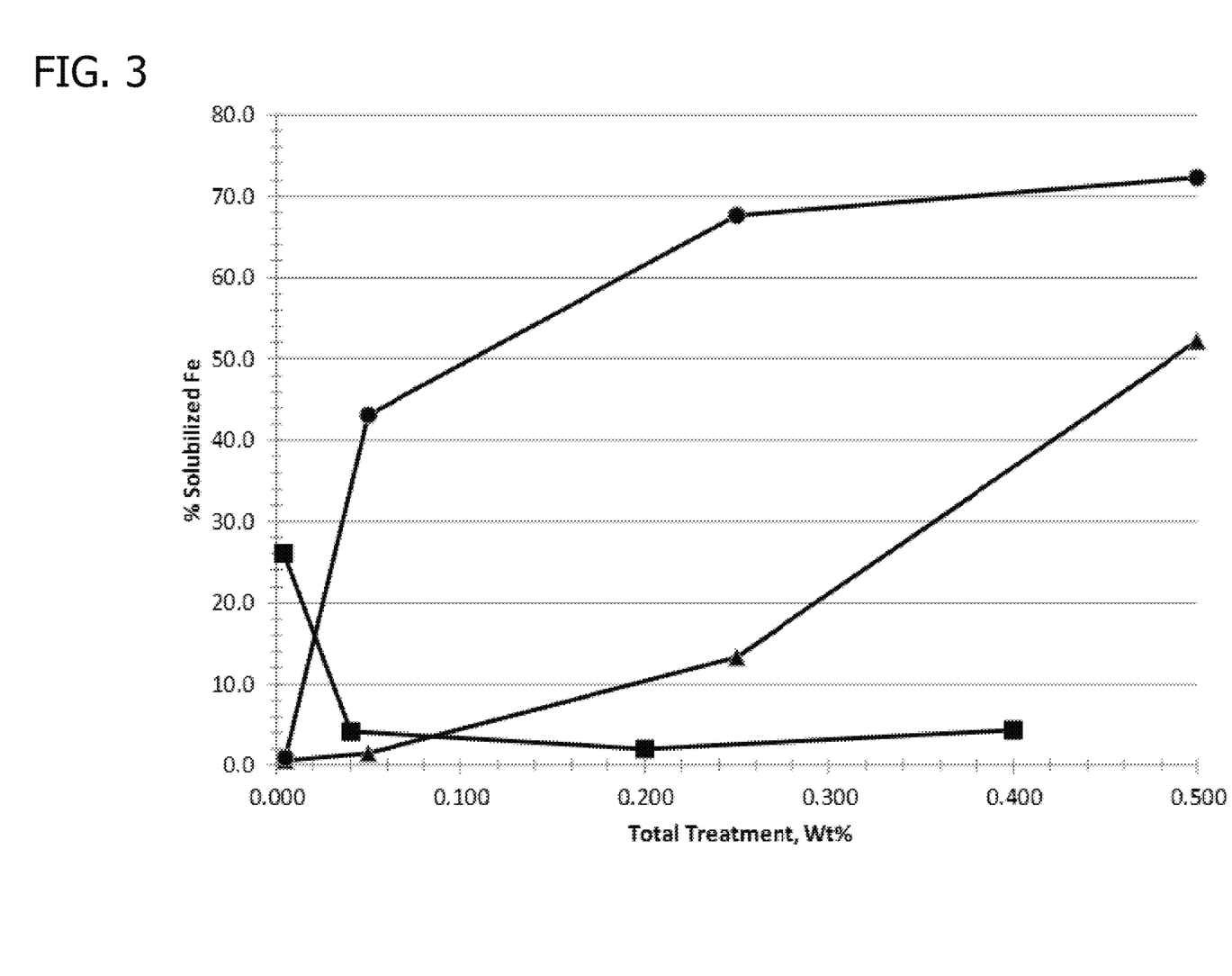
FIG. 3 is a graph of the concentration of solubilized iron versus total treatment (wt. % iron sulfide dissolver) in an iron sulfide solubilization test to show the effect of a corrosion inhibitor including 25% sodium gluconate (-●-) in dissolving iron sulfide as compared to the same material including 25% THPS (-▲-); corrosion inhibitor control (-■-).

The results are shown in FIG. 3, wherein the corrosion inhibitor formulation including 25% sodium gluconate was significantly more effective in dissolving iron sulfide than the same formulation including 25% THPS.

The terms "comprise(s)," "include(s)," "having," "has," "can," "contain(s)," and variants thereof, as used herein, are intended to be open-ended transitional phrases, terms, or words that do not preclude the possibility of additional steps or components. The singular forms "a," "and," "the" and "said" include plural references unless the context clearly dictates otherwise. The present disclosure also contemplates other embodiments "comprising," "consisting of" and "consisting essentially of," the embodiments or elements presented herein, whether explicitly set forth or not.

In view of the above, it will be seen that the several objects of the invention are achieved and other advantageous results attained.

As various changes could be made in the above compositions and processes without departing from the scope of the invention, it is intended that all matter contained in the above description and shown in the accompanying figure shall be interpreted as illustrative and not in a limiting sense.

What is claimed is:

1. A method of inhibiting corrosion at a surface and removing hydrocarbonaceous deposits from the surface, the method comprising:
continuously adding an iron sulfide dissolver to a fluid which contacts a surface of a wellbore or equipment used in production, processing, transportation, storage or separation of the fluid to inhibit corrosion and/or remove hydrocarbonaceous deposits from the surface, the iron sulfide dissolver comprising allaric acid, altaric acid, altraric acid, altronic acid, arabinaric acid, arabinonic acid, dihomocitric acid, fructuronic acid, fuconic acid, galactaric acid, galactonic acid, galacturonic acid, glucaric acid, glucoheptonic acid, gluconic acid, glucuronic acid, gulonic acid, homocitric acid, homoisocitric acid, idaric acid, idonic acid, iduronic acid, isocitric acid, mannaric acid, mannonic acid, octulosonic acid, rhamnonic acid, ribonic acid, tagaturonic acid, xylonic acid, or xyluronic acid, or a salt or derivative thereof, or a combination thereof;
the fluid comprising natural gas or a liquid hydrocarbon; and
wherein the iron sulfide dissolver inhibits iron sulfide formation on the surface during use of the wellbore or the equipment.

2. The method of claim 1, wherein the method continuously adds the iron sulfide dissolver and the iron sulfide dissolver comprises gluconic acid, a salt thereof, or a combination thereof.

3. The method of claim 1, wherein the method continuously adds the iron sulfide dissolver and the iron sulfide dissolver comprises sodium gluconate, ammonium gluconate, potassium gluconate, lithium gluconate, magnesium gluconate, calcium gluconate, cesium gluconate, gluconic acid, sodium glucarate, ammonium glucarate, potassium glucarate, lithium glucarate, magnesium glucarate, calcium glucarate, cesium glucarate, glucaric acid, or a combination thereof.

4. The method of claim 1, wherein the method continuously adds the iron sulfide dissolver and the iron sulfide dissolver comprises sodium gluconate, ammonium gluconate, potassium gluconate, lithium gluconate, magnesium gluconate, calcium gluconate, cesium gluconate, gluconic acid, or a combination thereof.

5. The method of claim 1, wherein
the iron sulfide dissolver comprises gluconic acid or a salt thereof.

6. The method of claim 1, wherein:
the equipment comprises a pipeline, a storage vessel, downhole injection tubing, a flow line, or an injection line.

7. The method of claim 1, wherein the iron sulfide dissolver is a component of a composition and the composition further comprises an organic solvent, and a corrosion inhibitor comprising an imidazoline compound, a quaternary ammonium compound, a pyridinium compound, or a combination thereof.

8. The method of claim 7, wherein the organic solvent comprises an alcohol, a hydrocarbon, a ketone, an ether, an alkylene glycol, a glycol ether, an amide, a nitrile, a sulfoxide, an ester, a polyol, or a combination thereof, and the composition optionally comprises water.

9. The method of claim 7, wherein the organic solvent comprises methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, glycerin, or a combination thereof.

10. The method of claim 9, wherein the organic solvent comprises methanol, ethanol, ethylene glycol, glycerin, or a combination thereof.

11. The method of claim 7, wherein the corrosion inhibitor comprises one or more of the following imidazoline compounds:

(A) an imidazoline of Formula (I):

wherein $R^{10}$ is a $C_1$-$C_{20}$ alkyl or a $C_1$-$C_{20}$ alkoxyalkyl group;

$R^{12}$ and $R^{13}$ are independently hydrogen or a $C_1$-$C_6$ alkyl group, $R^{11}$ and $R^{14}$ are independently hydrogen, $C_1$-$C_6$ alkyl, $C_1$-$C_6$ hydroxyalkyl, or $C_1$-$C_6$ arylalkyl; and $X^-$ is a halide, carbonate, sulfonate, phosphate, or an anion of an organic carboxylic acid;

or a tautomer thereof;

(B) an imidazolinium salt of Formula (II):

wherein $R^{10}$ is a $C_1$-$C_{20}$ alkyl or a $C_1$-$C_{20}$ alkoxyalkyl group;

$R^{12}$ and $R^{13}$ are independently hydrogen or a $C_1$-$C_6$ alkyl group, $R^{11}$ and $R^{14}$ are independently hydrogen, $C_1$-$C_6$ alkyl, $C_1$-$C_6$ hydroxyalkyl, or $C_1$-$C_6$ arylalkyl; and $X^-$ is a halide, carbonate, sulfonate, phosphate, or an anion of an organic carboxylic acid;

or a tautomer thereof;

(C) a bis-quaternized imidazoline compound of Formula (III):

wherein:

$R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof;

$R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof;

$L_1$ and $L_2$ are each independently absent, H, —COON, —SO$_3$H, —PO$_3$H$_2$, —COOR$_5$, —CONH$_2$, —CONHR$_5$, or —CON(R$_5$)$_2$;

$R_5$ is each independently a branched or unbranched alkyl, aryl, alkylaryl, alkylheteroaryl, cycloalkyl, or heteroaryl group having from 1 to about 10 carbon atoms;

n is 0 or 1, and when n is 0, $L_2$ is absent or H;

x is from 1 to about 10; and y is from 1 to about 5; or (D) a combination thereof.

12. The method of claim 7, wherein the corrosion inhibitor comprises a pyridinium compound of Formula (V):

wherein $R^9$ is an alkyl group, an aryl group, or an arylalkyl group, wherein said alkyl groups have from 1 to about 18 carbon atoms; and $X^-$ is a halide.

13. The method of claim 12, wherein the corrosion inhibitor comprises the pyridinium compound of Formula (V), $R^9$ is benzyl, and $X^-$ is chloride.

14. The method of claim 7, wherein the quaternary ammonium compound comprises either:

the quaternary ammonium salt, and the quaternary ammonium salt comprises a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, a trimethyl benzyl quaternary ammonium salt, or a trialkyl benzyl quaternary ammonium salt, wherein the alkyl group has about 6 to about 24 carbon atoms; or a quaternary ammonium compound of Formula (IV):

wherein $R_1$, $R_2$, and $R_3$ are independently $C_1$ to $C_{20}$ alkyl, $R_4$ is methyl or benzyl, and $X^-$ is a halide or methosulfate.

15. The method of claim 7, wherein the corrosion inhibitor further comprises an alkoxylated amine, a phosphate ester, or a monomeric or oligomeric fatty acid.

16. The method of claim 7, wherein the composition comprises from about 5 wt. % to about 95 wt. % of the iron sulfide dissolver, from about 5 to about 95 wt. % of the organic solvent, and from about 5 to about 95 wt. % of the corrosion inhibitor.

17. The method of claim 7, wherein the composition comprises from about 10 wt. % to about 60 wt. % of the iron sulfide dissolver, from about 10 to about 60 wt. % of the organic solvent, and from about 10 to about 60 wt. % of the corrosion inhibitor.

18. The method of claim 7, wherein the composition comprises from about 15 wt. % to about 30 wt. % of the iron sulfide dissolver, from about 20 to about 40 wt. % of the organic solvent, and from about 15 to about 30 wt. % of the corrosion inhibitor.

19. The method of claim 7, wherein the composition further comprises either: a sulfur-containing compound of $HS-(CH_2)_n OH$, wherein n is 2-6; or a sulfur-containing compound comprised of thioglycolic acid, 3,3'-dithiodipropionic acid, thiourea, 2-mercaptoethanol, L-cysteine, tert-butyl mercaptan, sodium thiosulfate, ammonium thiosulfate, sodium thiocyanate, ammonium thiocyanate, sodium metabisulfite, or a combination thereof.

20. The method of claim 7, wherein the composition further comprises at least one of an asphaltene inhibitor, a paraffin inhibitor, a scale inhibitor, an emulsifier, a water clarifier, a dispersant, an emulsion breaker, a hydrogen sulfide scavenger, a gas hydrate inhibitor, a biocide, a pH modifier, and a surfactant.

21. A method of inhibiting corrosion at a surface and removing hydrocarbonaceous deposits from the surface, the method comprising:

continuously adding an iron sulfide dissolver to a fluid which contacts a surface of a wellbore or equipment used in production, processing, transportation, storage or separation of the fluid to inhibit corrosion and/or remove hydrocarbonaceous deposits from the surface, the iron sulfide dissolver comprising allaric acid, altaric acid, altraric acid, altronic acid, arabinaric acid, arabinonic acid, dihomocitric acid, fructuronic acid, fuconic acid, galactaric acid, galactonic acid, galacturonic acid, glucaric acid, glucoheptonic acid, gluconic acid, glucuronic acid, gulonic acid, homocitric acid, homoisocitric acid, idaric acid, idonic acid, iduronic acid, isocitric acid, mannaric acid, mannonic acid, octulosonic acid, rhamnonic acid, ribonic acid, tagaturonic acid, xylonic acid, or xyluronic acid, or a salt or derivative thereof, or a combination thereof;

the fluid comprising natural gas or a liquid hydrocarbon; and wherein the iron sulfide dissolver dissolves iron sulfide present on the surface.

* * * * *